United States Patent
Horng

(10) Patent No.: US 9,057,215 B1
(45) Date of Patent: Jun. 16, 2015

(54) DUAL-SHAFT HINGE

(71) Applicant: Chin-Hsing Horng, Taoyuan (TW)

(72) Inventor: Chin-Hsing Horng, Taoyuan (TW)

(*) Notice: Subject to any disclaimer, the term of this patent is extended or adjusted under 35 U.S.C. 154(b) by 0 days.

(21) Appl. No.: 14/326,873

(22) Filed: Jul. 9, 2014

(30) Foreign Application Priority Data

Apr. 29, 2014 (TW) .............................. 103115252 A

(51) Int. Cl.
  *E05D 7/00* (2006.01)
  *E05D 11/08* (2006.01)
  *E05D 3/06* (2006.01)

(52) U.S. Cl.
  CPC ........................................ *E05D 3/06* (2013.01)

(58) Field of Classification Search
  CPC ............... E05D 3/12; E05D 3/06; E05D 3/10; G06F 1/1681; G06F 1/1616; G06F 1/1618; E05Y 2900/606; H04M 1/0216; H04M 1/0222; H04M 1/022; H05K 5/0226
  USPC ........... 16/366, 368, 369, 340, 337, 334, 389, 16/357, 360, 361, 342, 330, 303; 361/679.6, 679.9, 679.17, 679.27; 248/917–923, 284.1; 379/433.12, 379/433.13; 455/575.1, 575.3, 575.4, 455/550.1, 90.3; 348/333.06, 373, 794
  See application file for complete search history.

(56) References Cited

U.S. PATENT DOCUMENTS

| | | | | |
|---|---|---|---|---|
| 7,484,269 B2* | 2/2009 | Chih et al. | | 16/340 |
| 7,730,587 B2* | 6/2010 | Chang et al. | | 16/340 |
| 8,296,905 B2* | 10/2012 | Zhang et al. | | 16/366 |
| 8,627,546 B2* | 1/2014 | Zhang et al. | | 16/368 |
| 8,776,319 B1* | 7/2014 | Chang et al. | | 16/366 |
| 8,914,946 B2* | 12/2014 | Hsu et al. | | 16/366 |
| 2008/0109995 A1* | 5/2008 | Kuwajima et al. | | 16/354 |
| 2009/0000062 A1* | 1/2009 | Yamanami | | 16/366 |
| 2010/0149764 A1* | 6/2010 | Ueyama | | 361/749 |
| 2013/0318746 A1* | 12/2013 | Kuramochi | | 16/342 |
| 2014/0352113 A1* | 12/2014 | Chen et al. | | 16/366 |
| 2015/0013107 A1* | 1/2015 | Shin et al. | | 16/366 |
| 2015/0040353 A1* | 2/2015 | Chen et al. | | 16/366 |

* cited by examiner

*Primary Examiner* — Chuck Mah

(57) ABSTRACT

A dual-shaft hinge includes an axle housing, a pivot shaft set including a first pivot shaft and a second pivot shaft respectively pivotally coupled to the axle housing, a transmission mechanism including a first transmission member connected to the first pivot shaft and a second transmission member connected to the second pivot shaft, and a link connected between the first transmission member and the second transmission member in such a manner that the first pivot shaft and the second pivot shaft are rotatable relative to each other and the axle housing is turnable about the second pivot shaft to prevent the problem of a broken component due to overstress, or the problem of a jammed component.

4 Claims, 20 Drawing Sheets

A-A

DUAL-SHAFT HINGE

BACKGROUND OF THE INVENTION

1. Field of the Invention

The present invention relates to hinge technology and more particularly, to a dual-shaft hinge, which is practical for use in a dual leaf electronic device to smoothen the pivoting motion of the cover member of the dual leaf electronic device relative to the base member thereof.

2. Description of the Related Art

Hinges are intensively used in flip-up mobile electronic devices, such as notebooks, smart phones, and etc. to pivotally connect a base member and a cover member together, allowing only a limited angle of rotation between them. Some dual leaf mobile electronic devices allow the cover member to be turned from the top side of the base member to the bottom side thereof, enabling the dual leaf mobile electronic devices to be used as a tablet computer. A hinge for this application is a dual-shaft design. Taiwan Patent Publication Number M460957, equivalent to Chinese Patent CN102261371A, discloses a dual-shaft hinge design. According to this design, a link is used to pivotally couple two pivot shafts in an eccentric manner, wherein rotating one pivot shaft causes the other pivot shaft to be rotated, turning the cover member to the bottom side of the base member. However, using the link to force the two pivot shafts to rotate at the same time can cause concentration of high stress on the connection rods of the two pivot shafts, leading to breaking of the connection rods. Further, because the two pivot shafts are simultaneously rotated, a minor rotation angle deviation can cause a component jam, leading to hinge failure.

SUMMARY OF THE INVENTION

The present invention has been accomplished under the circumstances in view. It is therefore the main object of the present invention to provide a dual-shaft hinge, which uses a link for enabling a first pivot shaft and a second pivot shaft to be rotated relative to each other and an axle housing to be turned about the second pivot shaft to prevent the problem of a broken component due to overstress, or the problem of a jammed component.

To achieve this and other objects of the present invention, a dual-shaft hinge of the present invention comprises an axle housing, a pivot shaft set, a transmission mechanism and a link. The axle housing comprises a base, a first bearing portion smoothly curved from a right side of a top wall of the base in direction toward an opposing left side of the top wall, a first pivot shaft chamber defined between the top wall and the first bearing portion, a first gap defined between a distal end of the first bearing portion and the top wall in communication with one lateral side of the first pivot shaft chamber, a second bearing portion smoothly curved from a left side of an opposing bottom wall in direction toward an opposing right side of the bottom wall, a second pivot shaft chamber defined between the bottom wall and the second bearing portion, and a second gap defined between a distal end of the second bearing portion and the bottom wall in communication with one lateral side of the second pivot shaft chamber. The pivot shaft set comprises a first pivot shaft and a second pivot shaft. The first pivot shaft comprises a first shaft body mounted in the first pivot shaft chamber of the axle housing, and a first positioning tip axially extended from one end of the first shaft body. The second pivot shaft comprises a second shaft body mounted in the second pivot shaft chamber of the axle housing, and a second positioning tip axially extended from one end of the second shaft body. The transmission mechanism comprises a first transmission member and a second transmission member. The first transmission member comprises a first connection hole fixedly fastened to the first positioning tip of the first pivot shaft, and a first position-limit rod located at one side thereof adjacent to the first connection hole. The second transmission member comprises a second connection hole fixedly fastened to the second positioning tip of the second pivot shaft, and a second position-limit rod located at one side thereof adjacent to the second connection hole. The link comprises a first position-limit hole and a second position-limit hole respectively disposed near two distal ends thereof and respectively coupled to the first position-limit rod and second position-limit rod of the transmission mechanism. The first position-limit hole defines a first abutment portion near the second position-limit hole, and a second abutment portion remote from the second position-limit hole. Further, the distance between the first abutment portion and the second abutment portion is larger than the outer diameter of the first position-limit rod.

DETAILED DESCRIPTION OF THE PREFERRED EMBODIMENT

Figure 1:
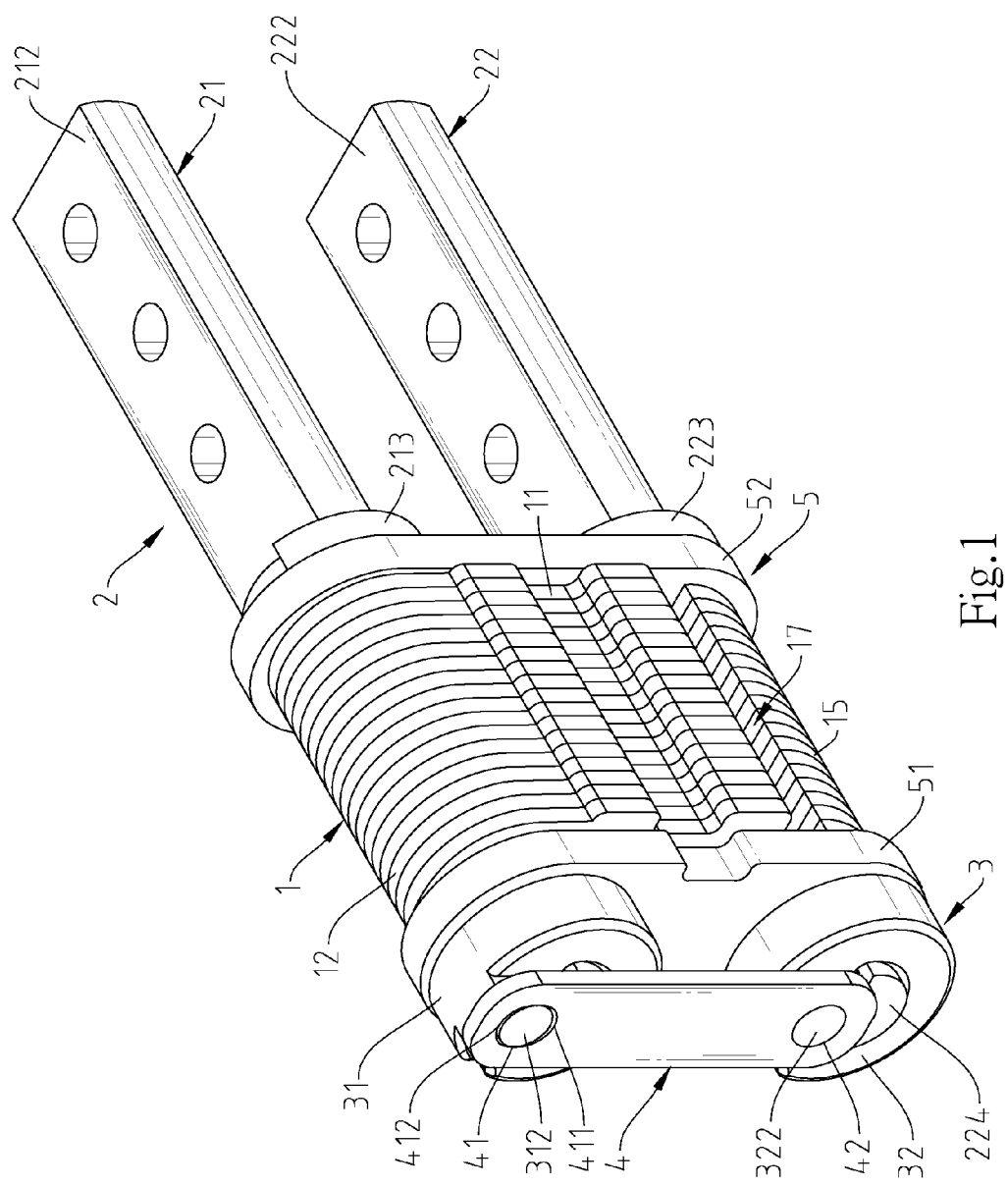
FIG. 1 is an elevational view of a dual-shaft hinge in accordance with a first embodiment of the present invention.
Figure 2:
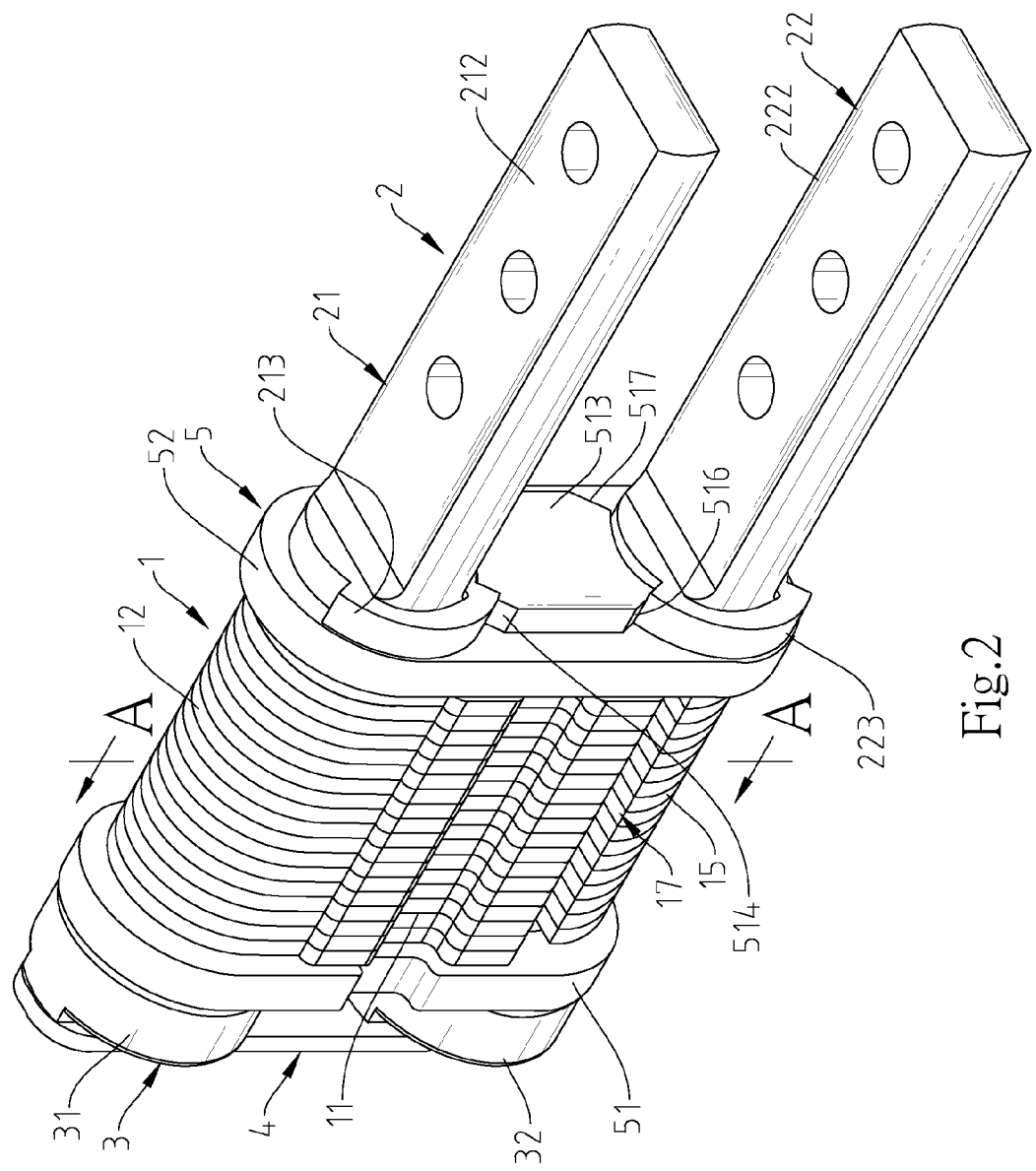
FIG. 2 corresponds to FIG. 1 when viewed from another angle.
Figure 3:
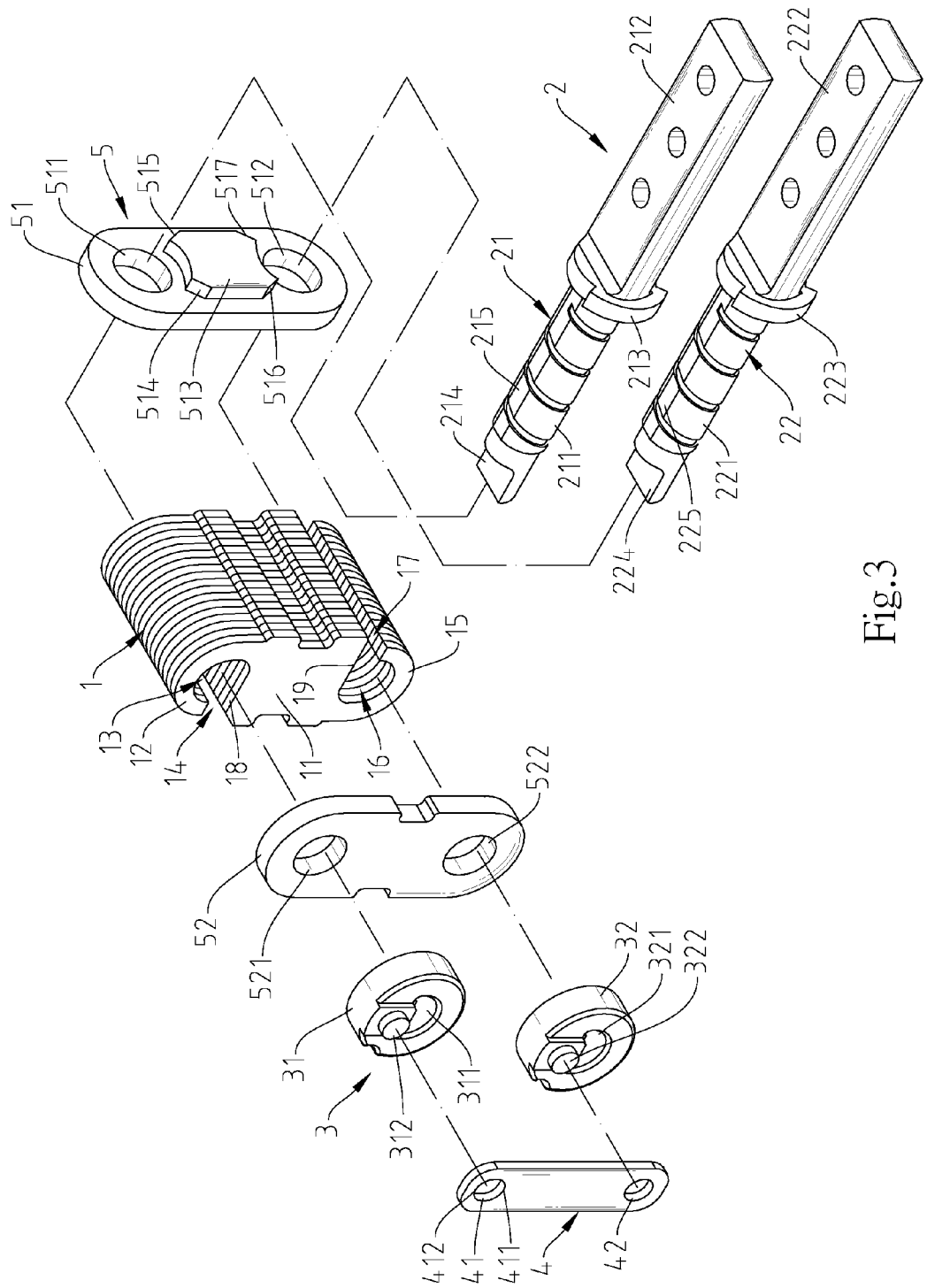
FIG. 3 is an exploded view of the dual-shaft hinge in accordance with the first embodiment of the present invention.
Figure 4:
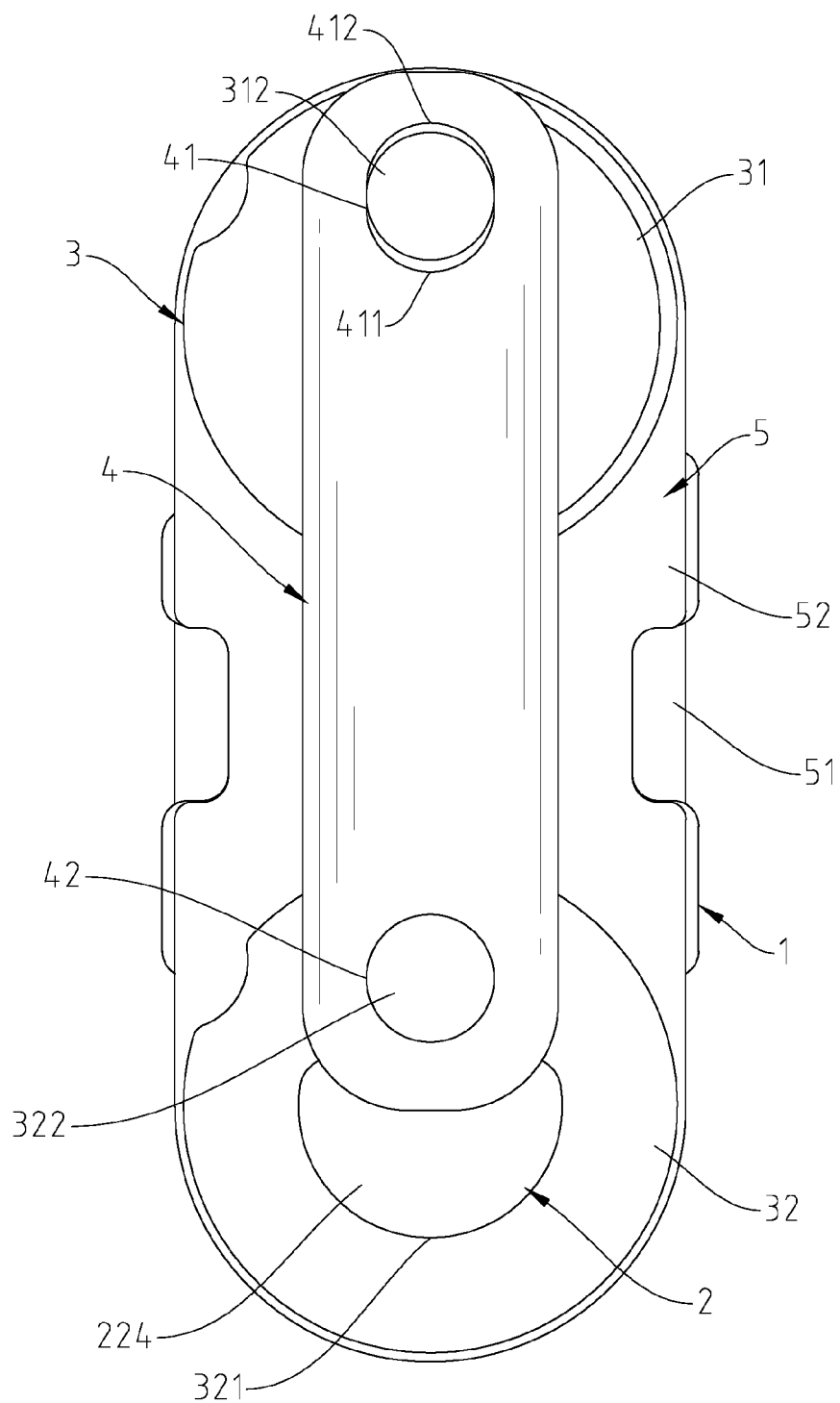
FIG. 4 is a front view of the dual-shaft hinge in accordance with the first embodiment of the present invention.
Figure 5:
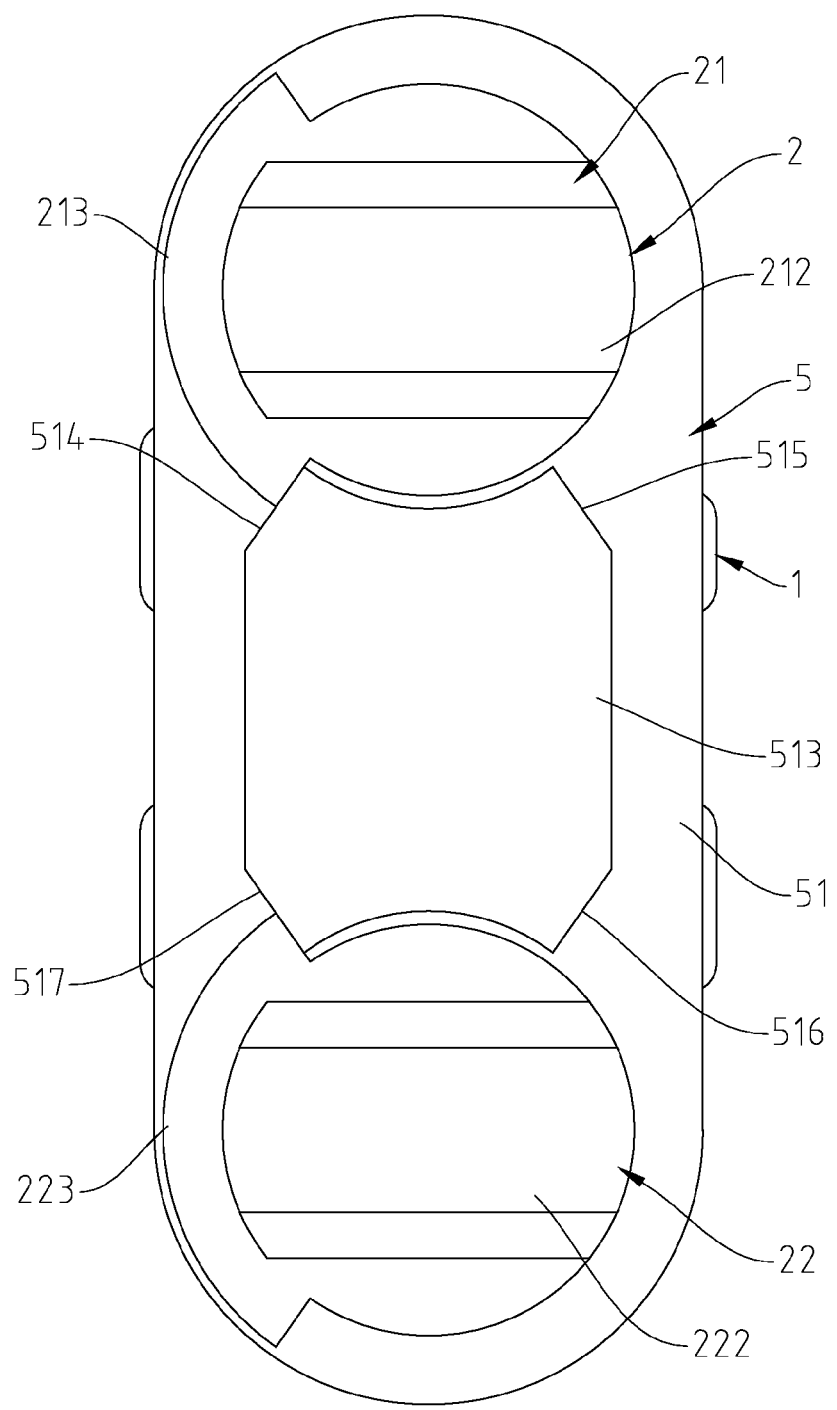
FIG. 5 is a rear side view of the dual-shaft hinge in accordance with the first embodiment of the present invention.
Figure 6:
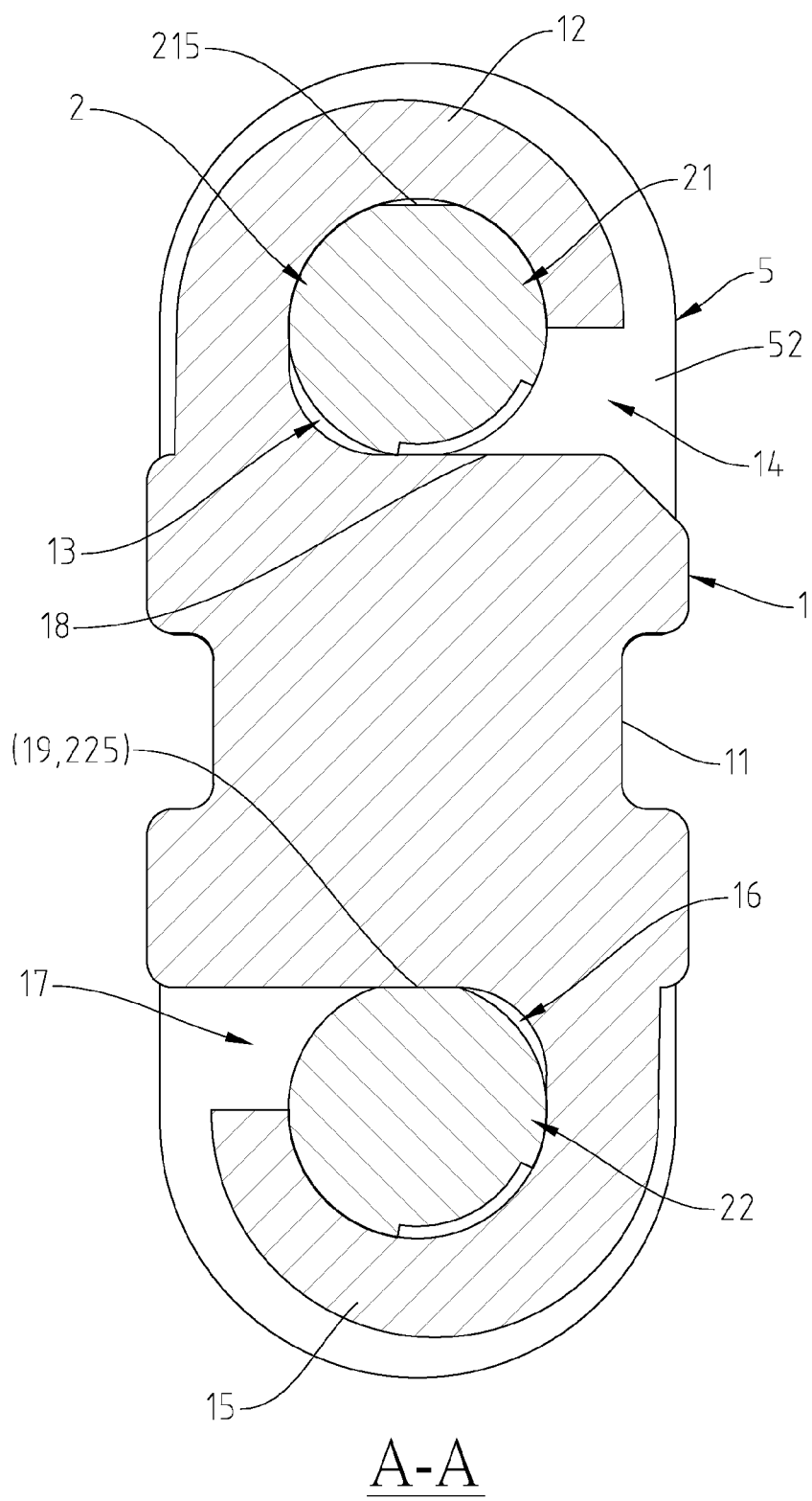
FIG. 6 is a sectional view taken along line A-A of FIG. 2.

Referring to FIGS. 1-6, a dual-shaft hinge in accordance with a first embodiment of the present invention is shown. The dual-shaft hinge comprises an axle housing 1, a pivot shaft set 2, a transmission mechanism 3, a link 4 and a positioning device set 5.

The axle housing 1 comprises a base 11, a first bearing portion 12 smoothly curved from one side, namely the right side of a top wall of the base 11 in direction toward an opposite side, namely, the left side of the top wall of the base 11, a first pivot shaft chamber 13 defined between the top wall of the base 11 and the first bearing portion 12, a first gap 14 defined between the distal end of the first bearing portion 12 and the top wall of the base 11 in communication with one lateral side of the first pivot shaft chamber 13, a second bearing portion 15 smoothly curved from one side, namely, the left side of an opposing bottom wall of the base 11 in direction toward an opposite side, namely, the right side of the bottom wall of the base 11, a second pivot shaft chamber 16 defined between the bottom wall of the base 11 and the second bearing portion 15, a second gap 17 defined between the distal end of the second bearing portion 15 and the bottom wall of the base 11 in communication with one lateral side of the second pivot shaft chamber 16, a planar first bearing wall 18 formed integral with the top wall of the base 11, and a planar second bearing wall 19 formed integral with the bottom wall of the base 11.

The pivot shaft set 2 comprises a first pivot shaft 21 and a second pivot shaft 22. The first pivot shaft 21 comprises a first shaft body 211, a first connection bar 212 axially extended from one end of the first shaft body 211, a first positioning tip 214 axially extended from an opposite end of the first shaft body 211, a first position-limit flange 213 extended around the periphery of the first shaft body 211 adjacent to the first connection bar 212, and a first positioning plane 215 axially located on the periphery of the first shaft body 211. The second pivot shaft 22 comprises a second shaft body 221, a second connection bar 222 axially extended from one end of the second shaft body 221, a second positioning tip 224 axially extended from an opposite end of the second shaft body 221, a second position-limit flange 223 extended around the periphery of the second shaft body 221 adjacent to the second connection bar 222, and a second positioning plane 225 axially located on the periphery of the second shaft body 221. Further, the first shaft body 211 of the first pivot shaft 21 is positioned in the first pivot shaft chamber 13 of the axle housing 1; the second shaft body 221 of the second pivot shaft 22 is positioned in the second pivot shaft chamber 16 of the axle housing 1.

The transmission mechanism 3 comprises a first transmission member 31 and a second transmission member 32. The first transmission member 31 comprises a first connection hole 311 cut through opposing front and back sides thereof at the center, and a first position-limit rod 312 located at the front side adjacent to the first connection hole 311. The second transmission member 32 comprises a second connection hole 321 cut through opposing front and back sides thereof at the center, and a second position-limit rod 322 located at the front side adjacent to the second connection hole 321. The first connection hole 311 of the first transmission member 31 is fixedly connected to the first positioning tip 214 of the pivot shaft set 2; the second connection hole 321 of the second transmission member 32 is fixedly connected to the second positioning tip 224 of the pivot shaft set 2.

The link 4 comprises a first position-limit hole 41 and a second position-limit hole 42. The first position-limit rod 312 and second position-limit rod 322 of the transmission mechanism 3 are respectively coupled to the first position-limit hole 41 and second position-limit hole 42 of the link 4. The first position-limit hole 41 defines a first abutment portion 411 at one side near the second position-limit hole 42, and a second abutment portion 412 at an opposite side remote from the second position-limit hole 42. Further, the distance between the first abutment portion 411 and the second abutment portion 412 is larger than the outer diameter of the first position-limit rod 312.

The positioning device set 5 comprises a first positioning member 51 and a second positioning member 52. The first positioning member 51 and the second positioning member 52 are respectively disposed at opposing front and back sides of the axle housing 1. Further, the second positioning member 52 is set between the axle housing 1 and the transmission mechanism 3. The first positioning member 51 comprises a first positioning hole 511 and a second positioning hole 512 respectively disposed near two distal ends thereof. The second positioning member 52 comprises a third positioning hole 521 and a fourth positioning hole 522 respectively disposed near two distal ends thereof. The first positioning hole 511 and the third positioning hole 521 are respectively pivotally connected to two opposite ends of the first shaft body 211 of the pivot shaft set 2. The second positioning hole 512 and the fourth positioning hole 522 are respectively pivotally connected to two opposite ends of the second shaft body 221 of the pivot shaft set 2. The first positioning member 51 further comprises a stop block 513 located at one side thereof between the first positioning hole 511 and the second positioning hole 512. The stop block 513 comprises a first abutment surface 514 and a second abutment surface 515 bilaterally disposed adjacent to the first positioning hole 511, and a third abutment surface 516 and a fourth abutment surface 517 bilaterally disposed adjacent to the second positioning hole 512.

Figure 7:
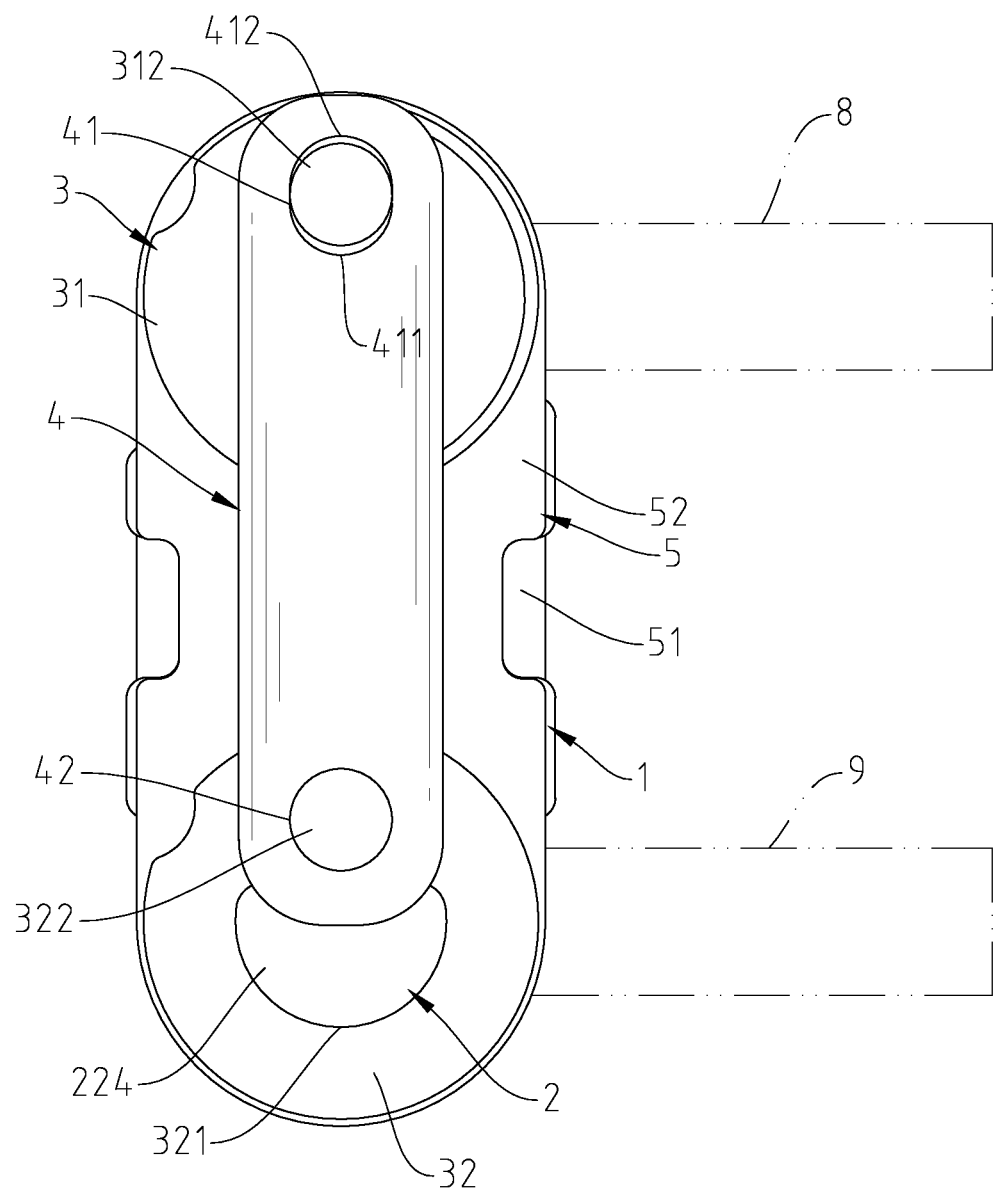
FIG. 7 is a schematic operational front view of the dual-shaft hinge in accordance with the first embodiment of the present invention (I).
Figure 8:
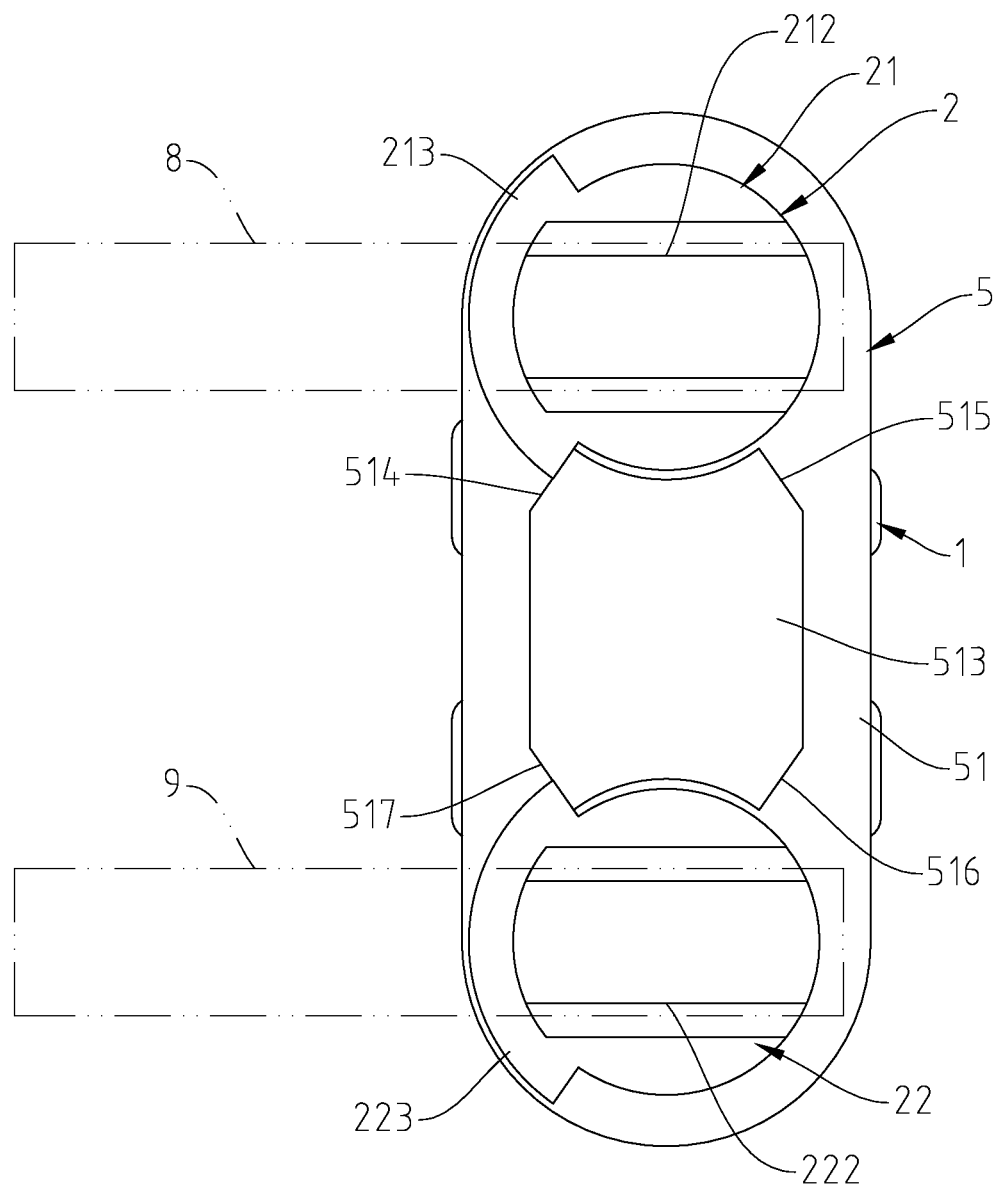
FIG. 8 is a schematic operational rear side view of the dual-shaft hinge in accordance with the first embodiment of the present invention (I).
Figure 9:
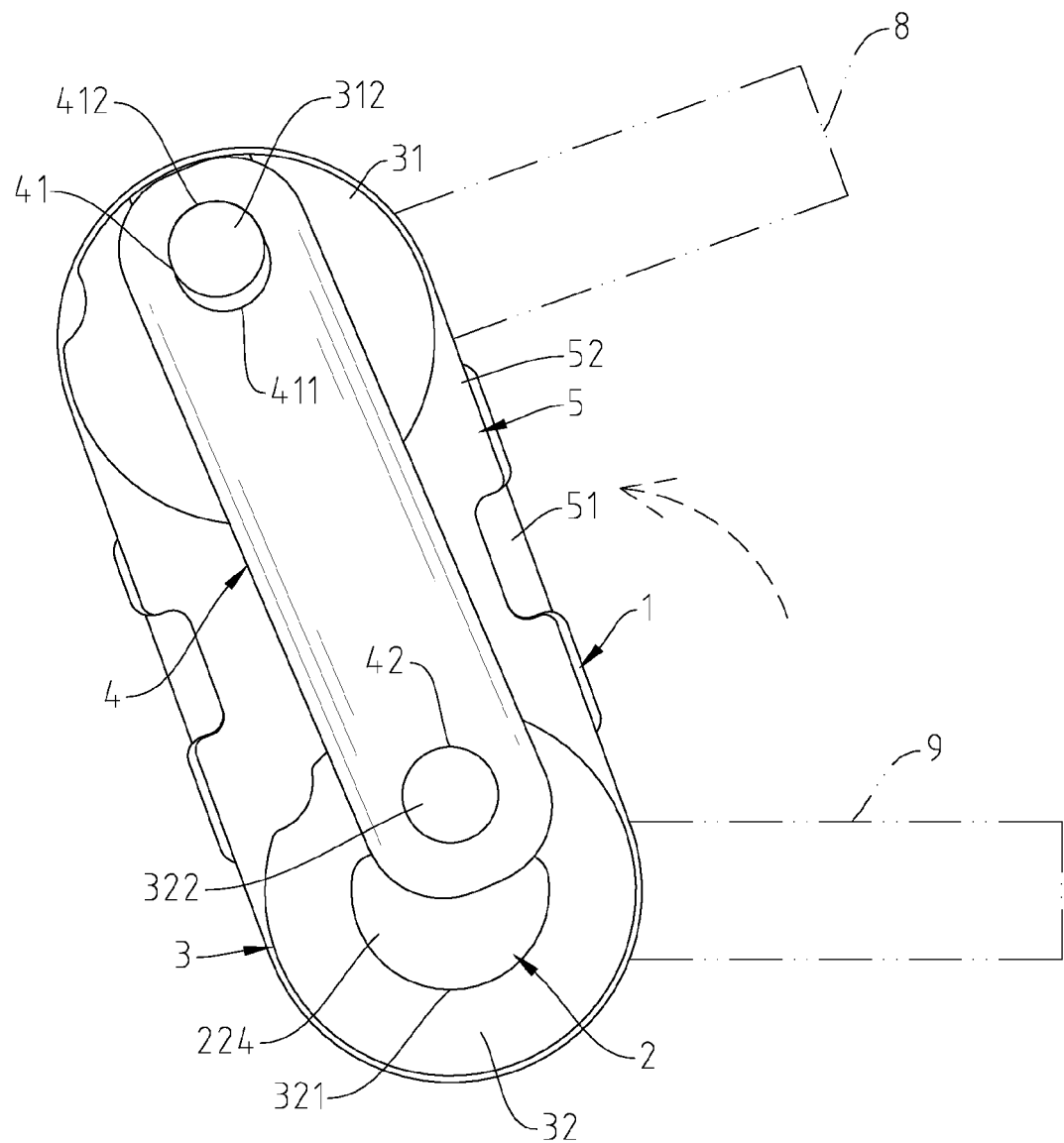
FIG. 9 is a schematic operational front view of the dual-shaft hinge in accordance with the first embodiment of the present invention (II).
Figure 10:
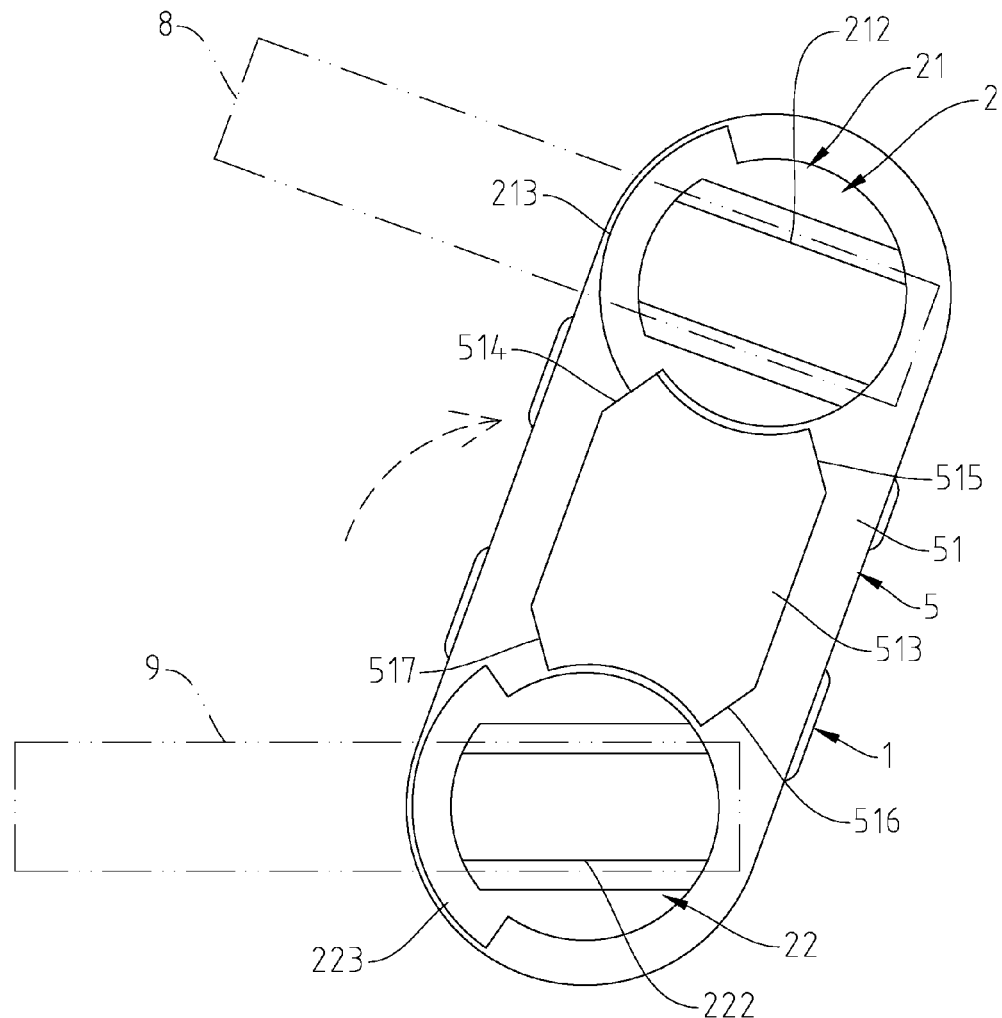
FIG. 10 is a schematic operational rear side view of the dual-shaft hinge in accordance with the first embodiment of the present invention (II).
Figure 11:
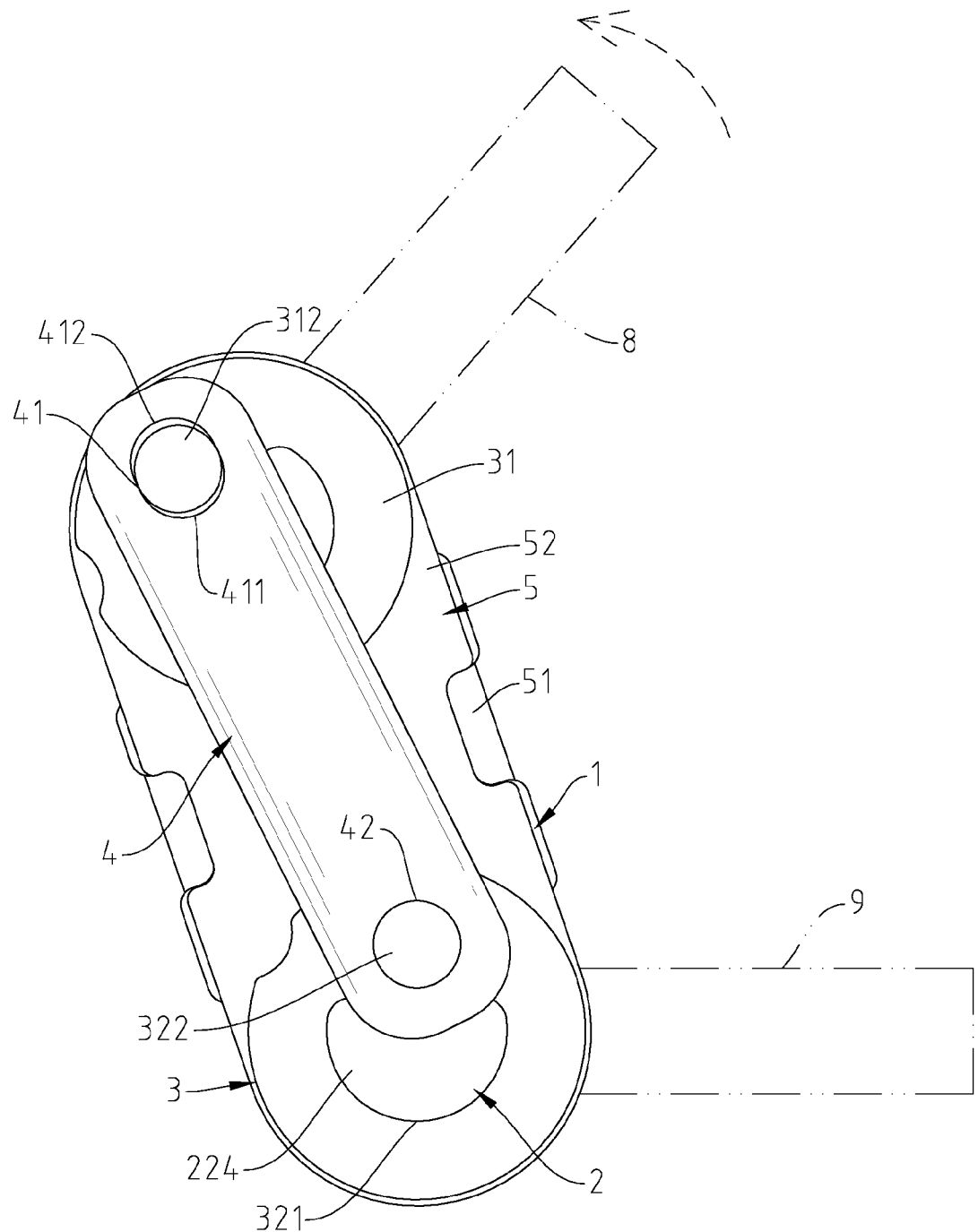
FIG. 11 is a schematic operational front view of the dual-shaft hinge in accordance with the first embodiment of the present invention (III).
Figure 12:
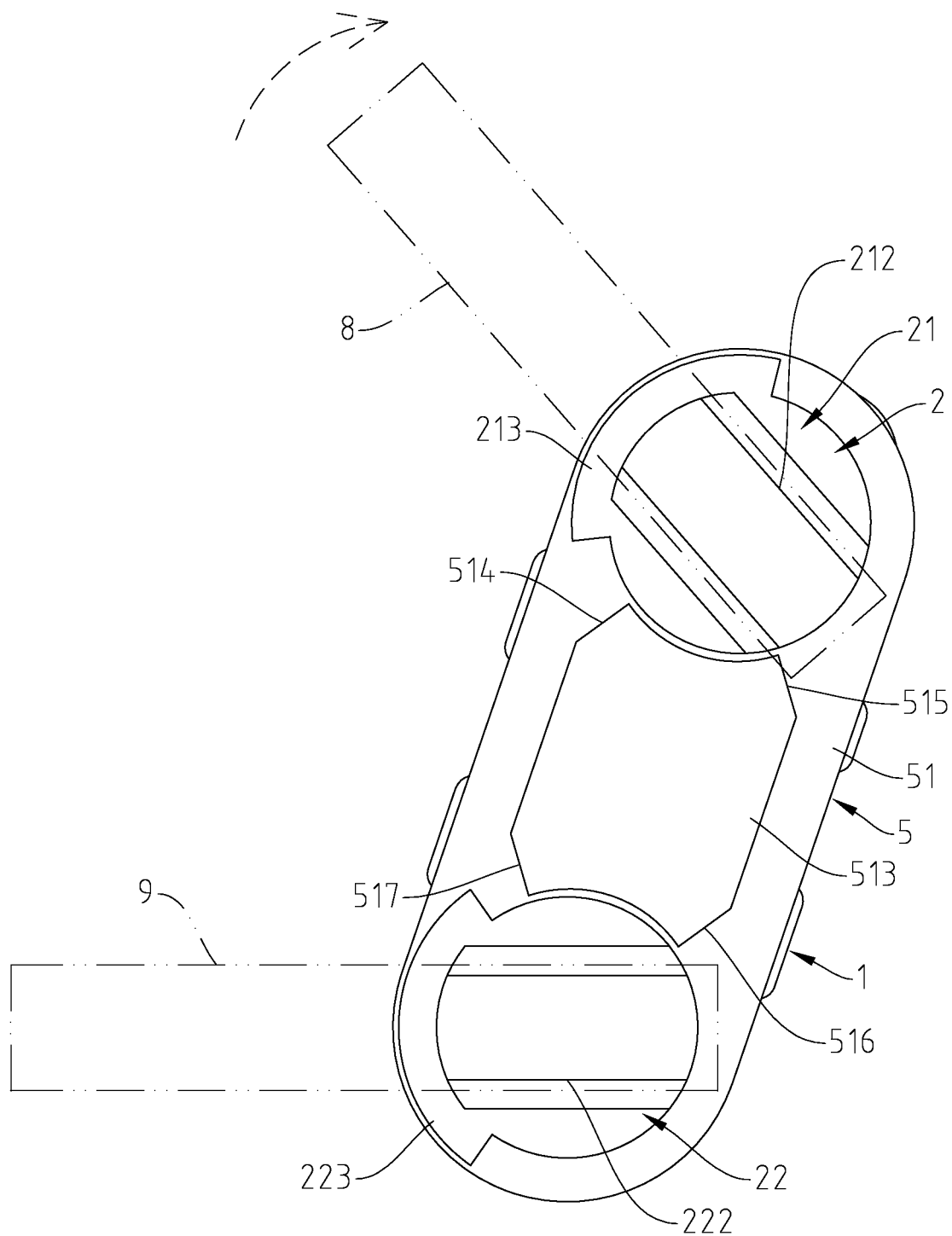
FIG. 12 is a schematic operational rear side view of the dual-shaft hinge in accordance with the first embodiment of the present invention (III).
Figure 13:
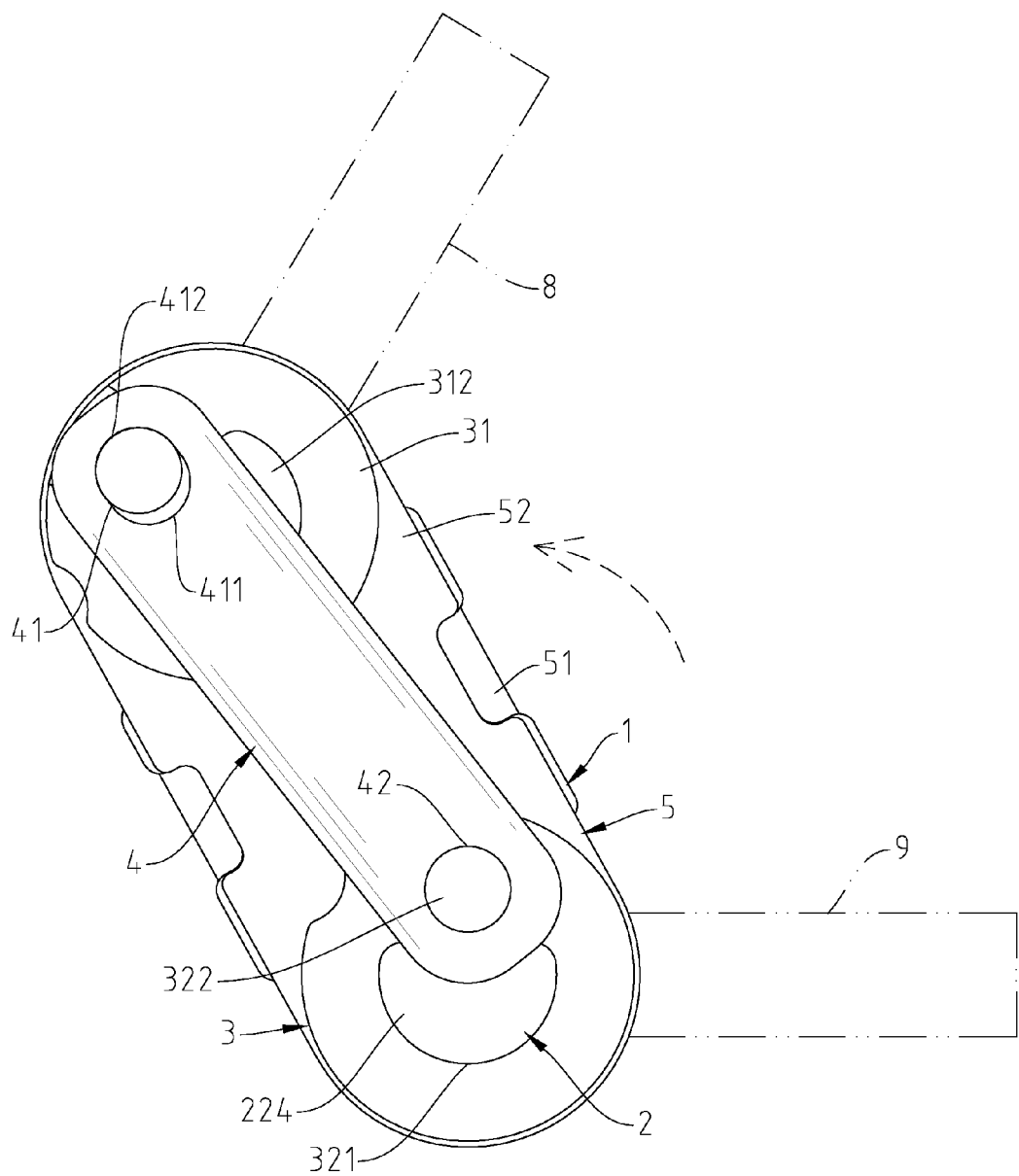
FIG. 13 is a schematic operational front view of the dual-shaft hinge in accordance with the first embodiment of the present invention (IV).
Figure 14:
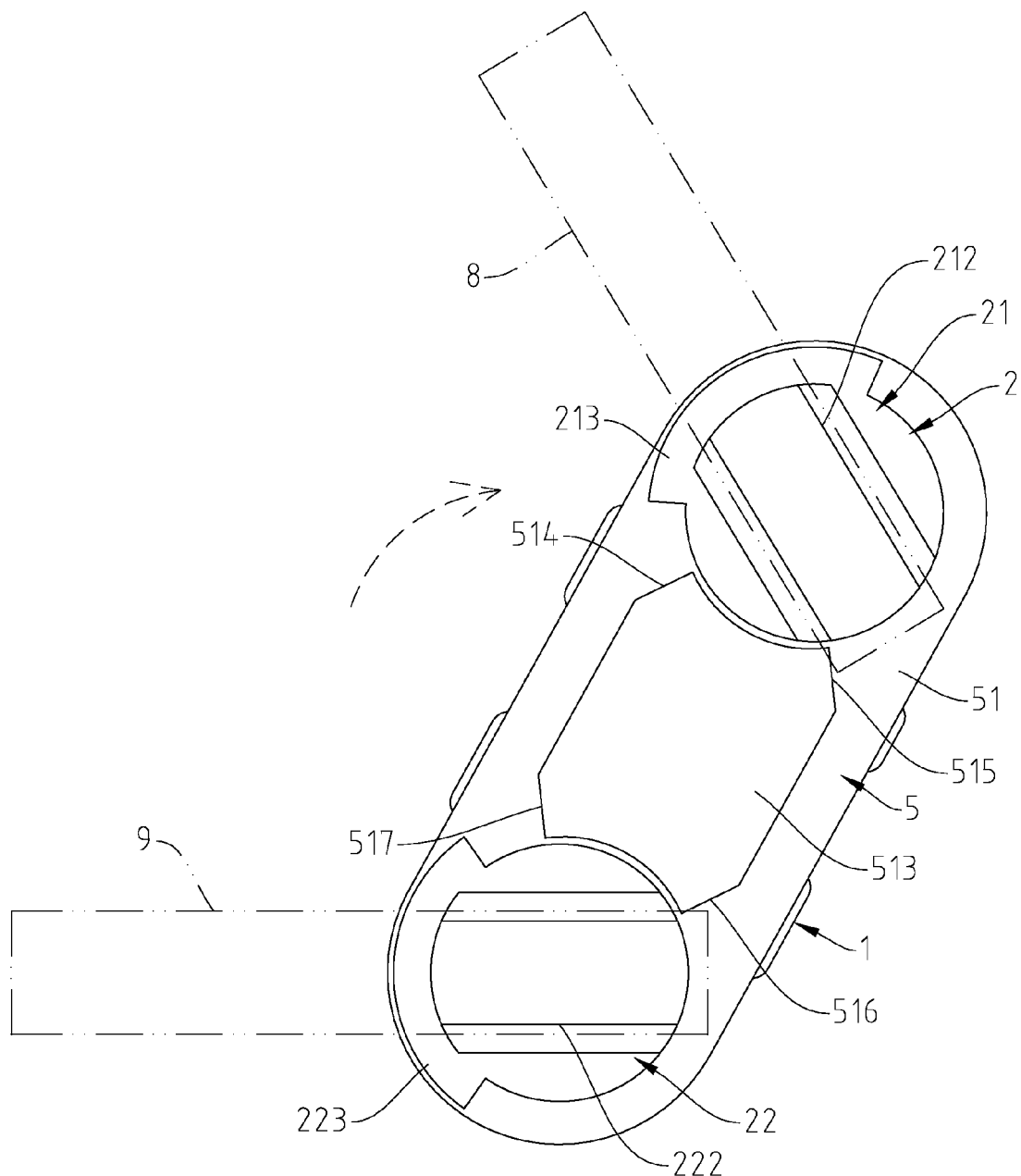
FIG. 14 is a schematic operational rear side view of the dual-shaft hinge in accordance with the first embodiment of the present invention (IV).
Figure 15:
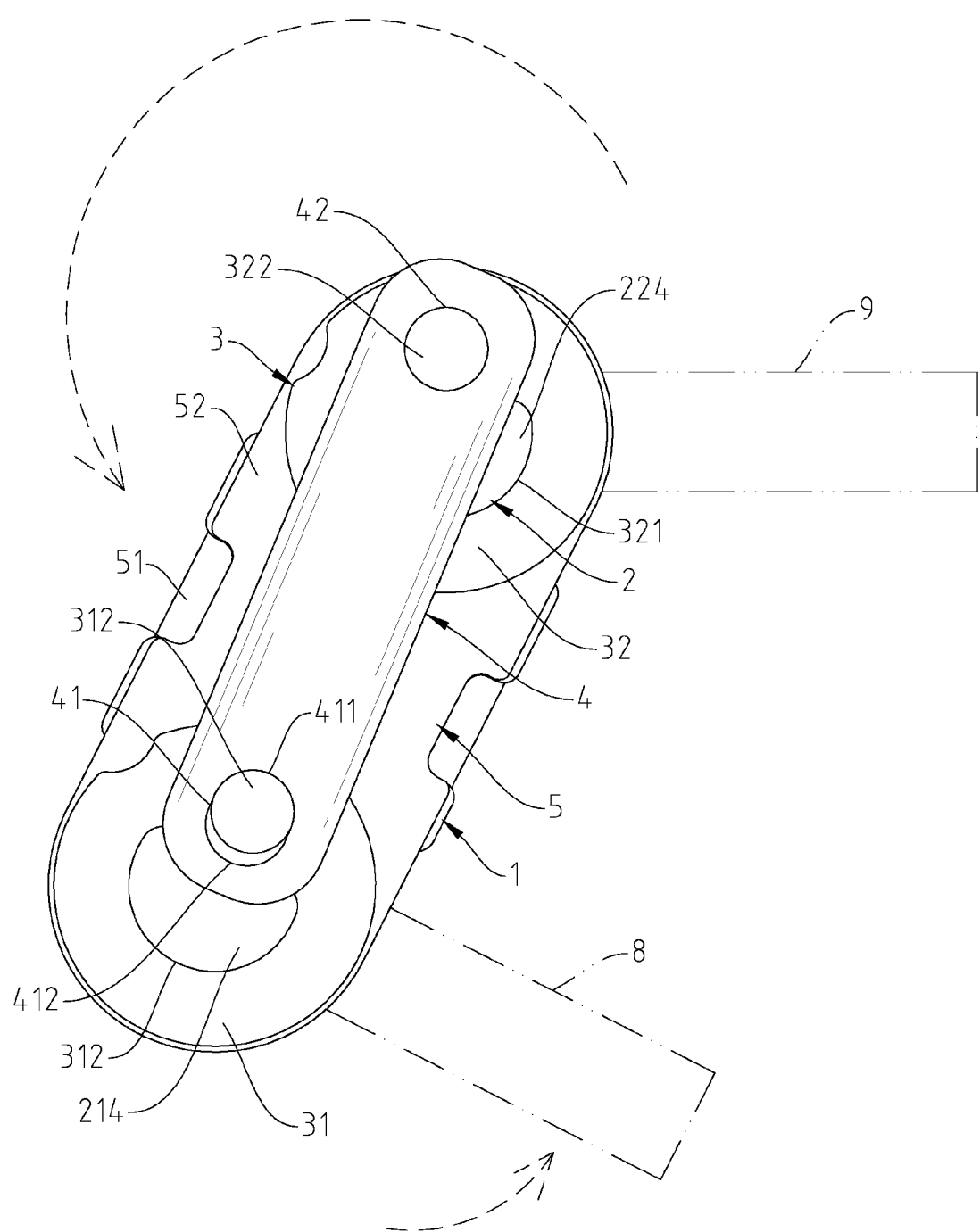
FIG. 15 is a schematic operational front view of the dual-shaft hinge in accordance with the first embodiment of the present invention (V).
Figure 16:
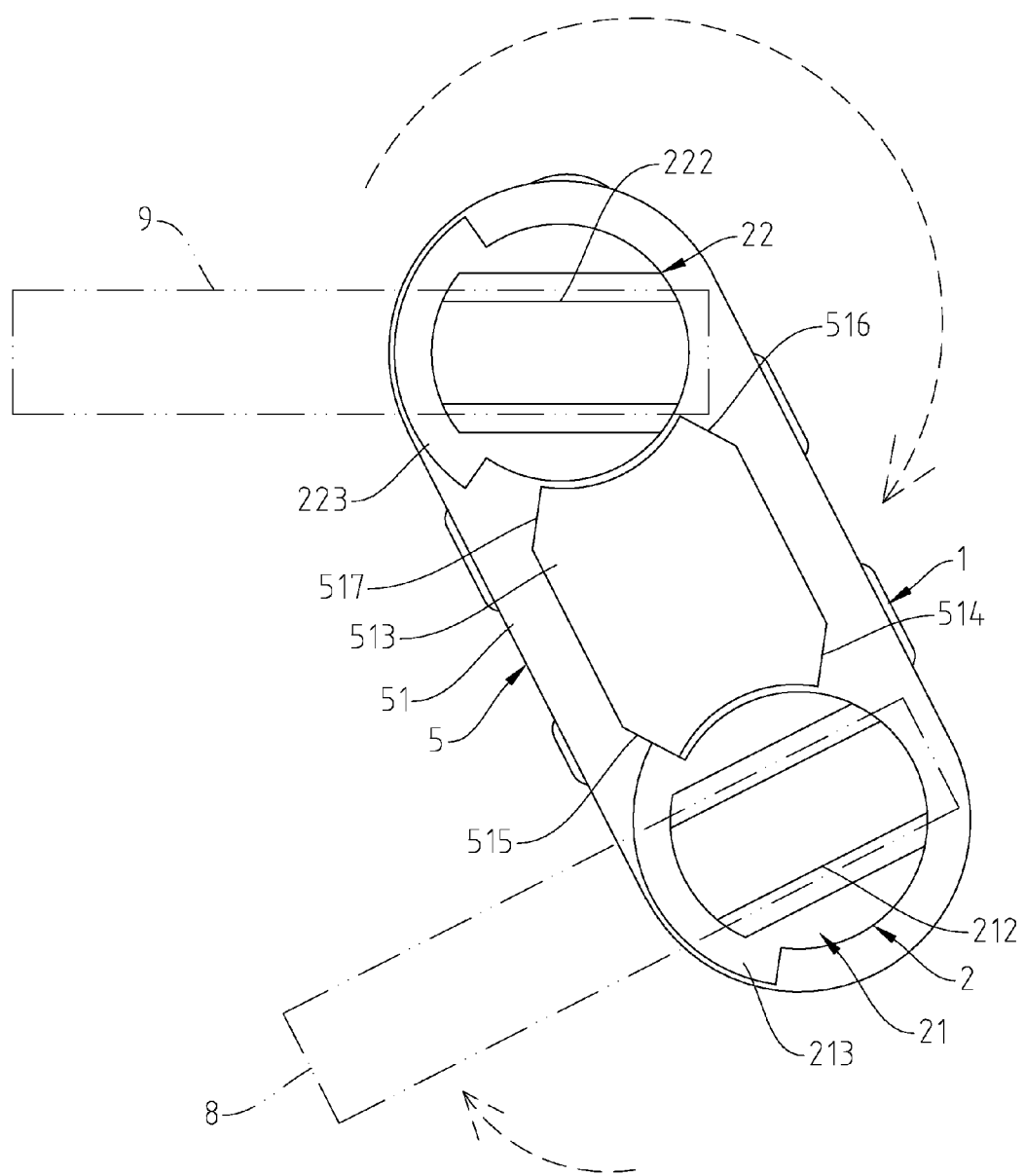
FIG. 16 is a schematic operational rear side view of the dual-shaft hinge in accordance with the first embodiment of the present invention (V).
Figure 17:
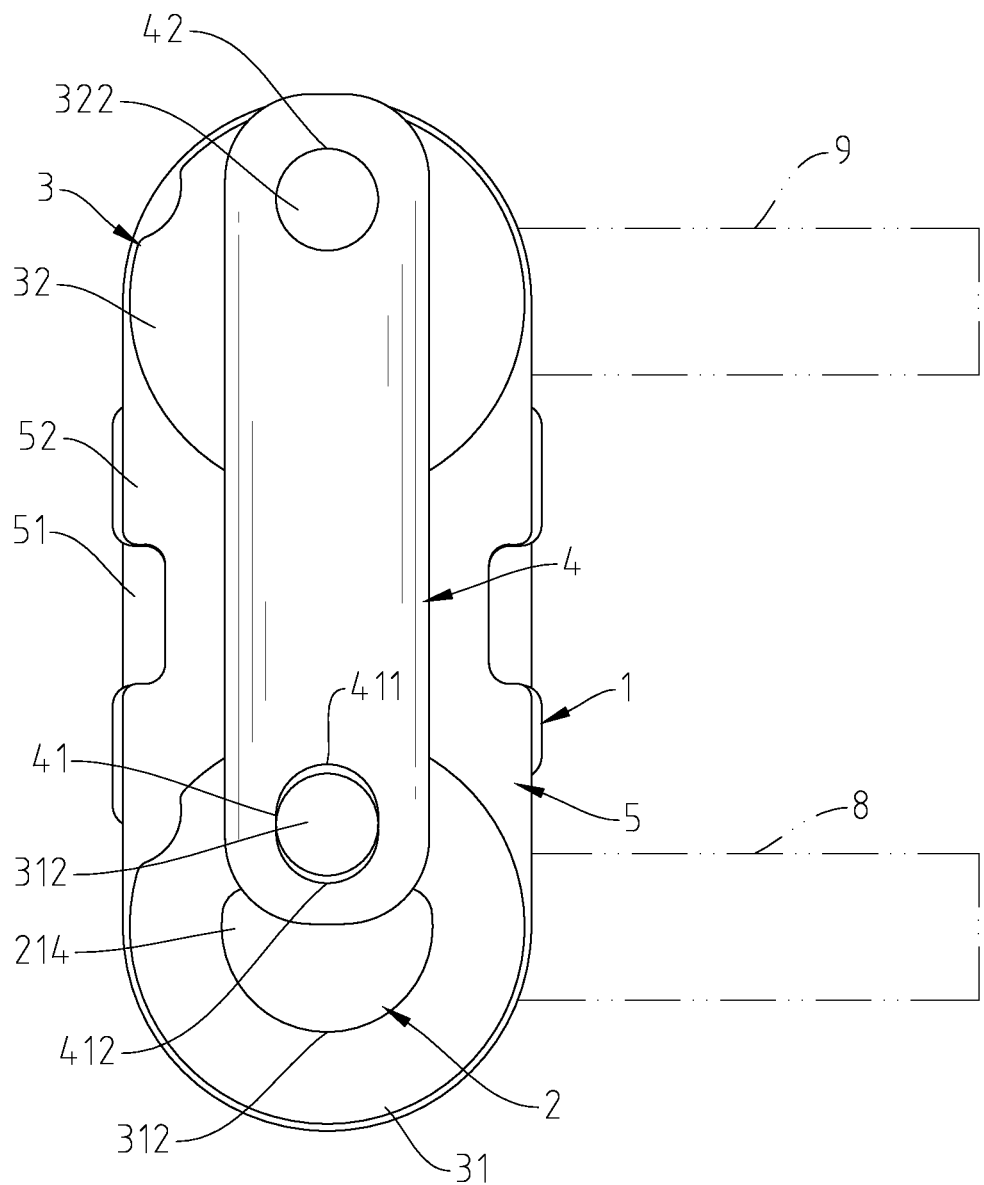
FIG. 17 is a schematic operational front view of the dual-shaft hinge in accordance with the first embodiment of the present invention (VI).
Figure 18:
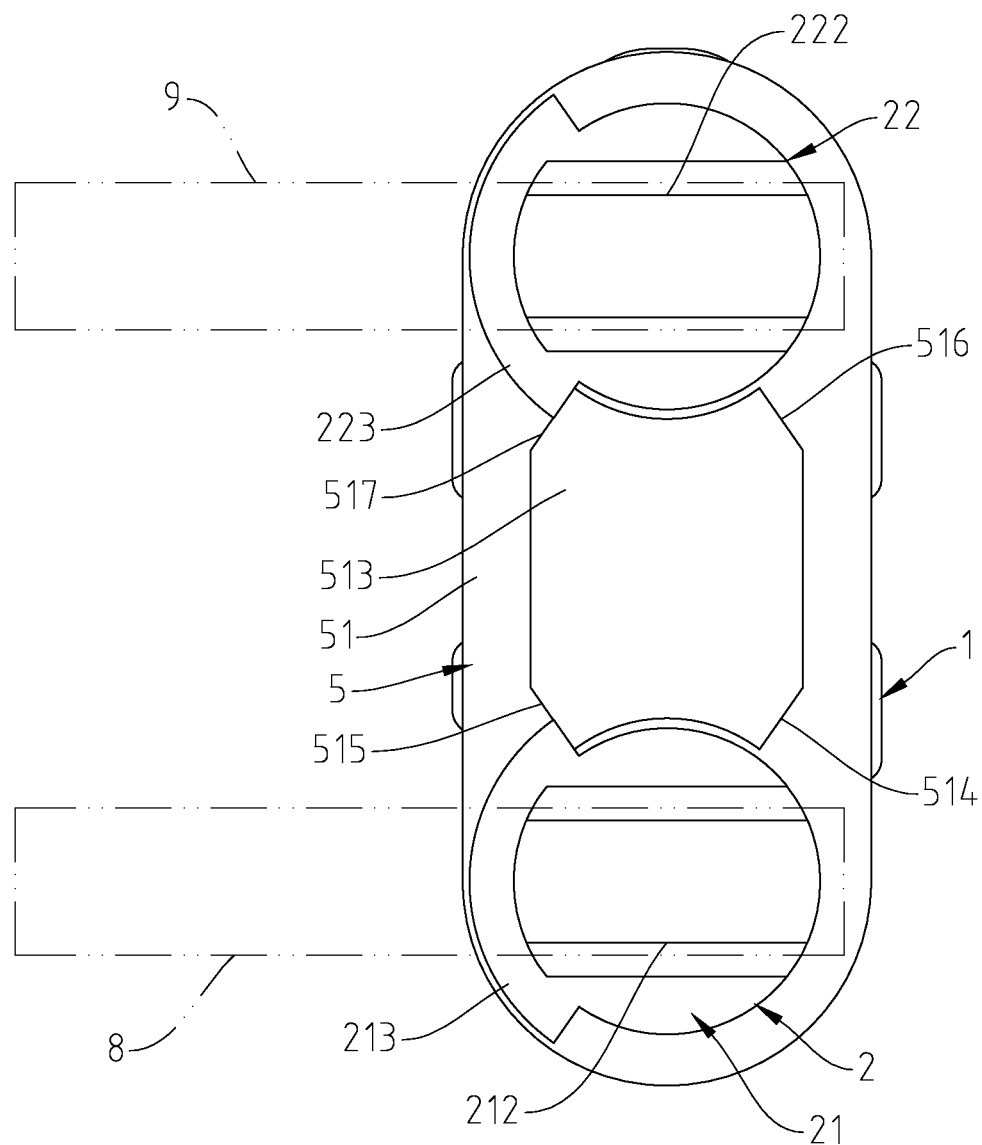
FIG. 18 is a schematic operational rear view of the dual-shaft hinge in accordance with the first embodiment of the present invention (VI).

The application of the dual-shaft hinge in accordance with the first embodiment of the present invention is outlined hereinafter with reference to FIGS. 7-18 and FIGS. 3 and 6 again. As illustrated in FIGS. 7 and 8, the first connection bar 212 and second connection bar 222 of the pivot shaft set 2 are respectively affixed to a top cover member 8 and a bottom cover member 9 (the cover member and base member of a mobile dual leaf electronic device). When the top cover member 8 and the bottom cover member 9 are closed, the top cover member 8 is disposed at the top side of the bottom cover member 9 in a parallel manner. At this time, the first position-limit rod 312 of the transmission mechanism 3 is kept apart from the second abutment portion 412 of the link 4 a distance, the first position-limit flange 213 of the first pivot shaft 21 is stopped against the first abutment surface 514 of the positioning device set 5, and the second position-limit flange 223 of the second pivot shaft 22 is stopped against the third abutment surface 516 of the positioning device set 5. As illustrated in FIGS. 9 and 10, when the user bias the top cover member 8 toward the bottom side of the bottom cover member 9, the friction force between the first bearing portion 12 and the first shaft body 211 is larger than the friction force between the second bearing portion 15 and the second shaft body 221 just because the extending direction of the first bearing portion 12 of the axle housing 1 is same as the biasing direction of the top cover member 8 and the extending direction of the second bearing portion 15 of the axle housing 1 is reverse to the biasing direction of the top cover member 8, allowing the axle housing 1 to be turned about the second shaft body 221 toward the top cover member 8 to move the second position-limit flange 223 away from the third abutment surface 516 toward the fourth abutment surface 517. At this time, the first pivot shaft 21 is immovable. Further, during rotation of the axle housing 1, the distance between the first position-limit rod 312 and second position-limit rod 322 of the transmission mechanism 3 is gradually increased. When the first position-limit rod 312 is stopped at the second abutment portion 412 of the first position-limit hole 41, the distance between the first position-limit rod 312 and the second position-limit rod 322 can no longer be increased, and thus, the axle housing 1 is prohibited from further rotation relative to the second shaft body 221. As illustrated in FIGS. 11 and 12, when the axle housing 1 is stopped from rotation relative to the second shaft body 221, the first shaft body 211 will be rotated in the first pivot shaft chamber 13 in the biasing direction of the top cover member 8. During rotation of the first shaft body 211, the distance between the first position-limit rod 312 and the second position-limit rod 322 is gradually reduced, causing the first position-limit rod 312 to be moved away from second abutment portion 412 toward the first abutment portion 411. At the same time, the first position-limit flange 213 is moved away from the first abutment surface 514 toward the second abutment surface 515. As illustrated in FIGS. 13 and 14, when a gap appears between the first bearing portion 12 and the first shaft body 211, the axle housing 1 will be forced to turn about the second shaft body 221 toward the top cover member 8 and the first pivot shaft 21 will be prohibited from rotation due to that the friction force between the first bearing portion 12 and the first shaft body 211 is larger than the friction force between the second bearing portion 15 and the second shaft body 221. Thus, repeating the aforesaid action enables the top cover member 8 to be turned to the bottom side of the bottom cover member 9. As illustrated in FIGS. 15-18, when the first position-limit flange 213 is stopped against the second abutment surface 515, the first pivot shaft 21 is prohibited from rotation. At this time, the axle housing 1 will be turned about the second shaft body 221 to the position where the second position-limit flange 223 is stopped at the fourth abutment surface 517, allowing the top cover member 8 to be biased to the bottom side of the bottom cover member 9 and kept in a parallel relationship relative to the bottom cover member 9. Thus, the first abutment surface 514 and second abutment surface 515 of the positioning device set 5 limit the rotating range of the first shaft body 211; the third abutment surface 516 and fourth abutment surface 517 of the positioning device set 5 limit the rotating range of the second shaft body 221, i.e., the top cover member 8 can be biased relative to the bottom cover member 9 within a predetermined angle.

Figure 19:
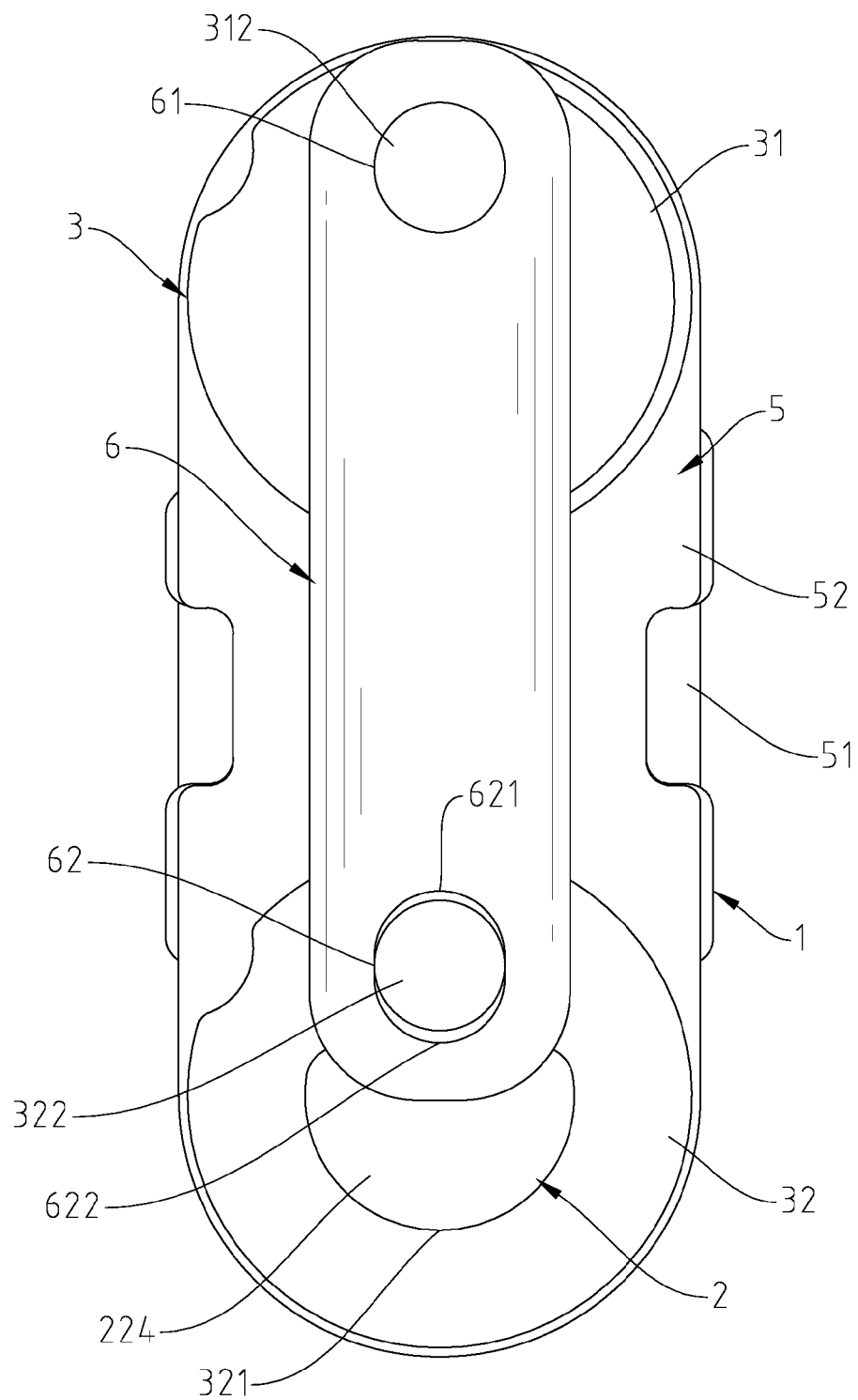
FIG. 19 is a front view of a dual-shaft hinge in accordance with a second embodiment of the present invention.

Referring to FIG. 19 and FIG. 5 again, a dual-shaft hinge in accordance with a second embodiment of the present invention is shown. This second embodiment is substantially similar to the aforesaid first embodiment with the exception that the link, referenced by 6, comprises a first position-limit hole 61 and a second position-limit hole 62 respectively disposed near two distal ends thereof; the first position-limit rod 312 and second position-limit rod 322 of the transmission mechanism 3 are respectively inserted in the first position-limit hole 61 and the second position-limit hole 62; the second position-limit hole 62 defines a first abutment portion 621 adjacent to the first position-limit hole 61 and a second abutment portion 622 remote from the first position-limit hole 61; the distance between the first abutment portion 621 and the second abutment portion 622 is larger than the outer diameter of the second position-limit rod 322; similarly, a gap can be provided between the second position-limit rod 322 and the second abutment portion 622 of the link 6 for allowing adjustment of the gap between the first position-limit rod 312 and second position-limit rod 322, thus, the axle housing 1 can be turned about the second pivot shaft 22, and the first pivot shaft 21 can be rotated in the axle housing 1 relative to the second pivot shaft 22.

Figure 20:
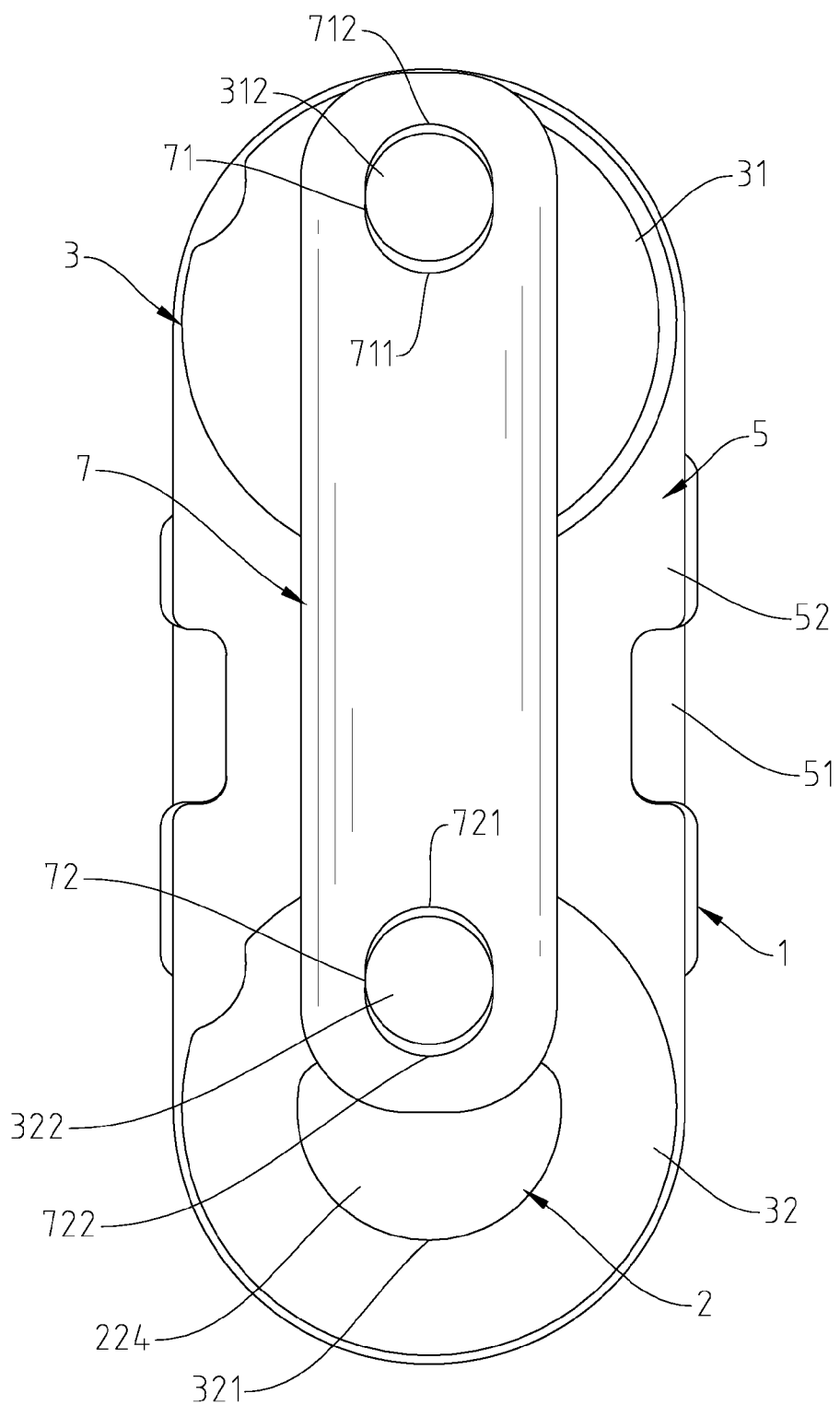
FIG. 20 is a front view of a dual-shaft hinge in accordance with a third embodiment of the present invention.

Referring to FIG. 20 and FIG. 5 again, a dual-shaft hinge in accordance with a third embodiment of the present invention is shown. This second embodiment is substantially similar to the aforesaid first embodiment with the exception that the link, referenced by 7, comprises a first position-limit hole 71 and a second position-limit hole 72 respectively disposed near two distal ends thereof; the first position-limit rod 312 and second position-limit rod 322 of the transmission mechanism 3 are respectively inserted in the first position-limit hole 71 and the second position-limit hole 72; the first position-limit hole 71 defines a first abutment portion 711 adjacent to the second position-limit hole 72 and a second abutment portion 712 remote from the second position-limit hole 72; the gap between the first abutment portion 711 and the second abutment portion 712 is larger than the outer diameter of the first position-limit rod 312; the second position-limit hole 72 defines a third abutment portion 721 adjacent to the first position-limit hole 71 and a fourth abutment portion 722 remote from the first position-limit hole 71; the distance between the third abutment portion 721 and the fourth abutment portion 722 is larger than the outer diameter of the second position-limit rod 322; similarly, the design of the first position-limit hole 71 and second position-limit hole 72 allows adjustment of the gap between the first position-limit rod 312 and the second position-limit rod 322 so that the axle housing 1 can be turned about the second pivot shaft 22, and the first pivot shaft 21 can be rotated in the axle housing 1 relative to the second pivot shaft 22.

In conclusion, the invention provides a dual-shaft hinge that has the technical features as follows: The design and functioning of the first position-limit hole 41 and second position-limit hole 42 of the link 4 allows adjustment of the gap between the first position-limit rod 312 and second position-limit rod 322 of the transmission mechanism 3; the design and functioning of the axle housing 1 enables the first pivot shaft 21 and the second pivot shaft 22 to produce different friction forces so that the axle housing 1 can be turned about the second pivot shaft 22 and the first pivot shaft 21 can be rotated in the axle housing 1 relative to the second pivot shaft 22, preventing the problem of a broken component due to overstress, or the problem of a jammed component.

Although particular embodiments of the invention have been described in detail for purposes of illustration, various modifications and enhancements may be made without departing from the spirit and scope of the invention.

What the invention claimed is:

1. A dual-shaft hinge, comprising an axle housing, a pivot shaft set, a transmission mechanism and a link, wherein:

said axle housing comprises a base, a first bearing portion smoothly curved from a right side of a top wall of said base in direction toward an opposing left side of the top wall of said base, a first pivot shaft chamber defined between the top wall of said base and said first bearing portion, a first gap defined between a distal end of said first bearing portion and the top wall of said base in communication with one lateral side of said first pivot shaft chamber, a second bearing portion smoothly curved from a left side of an opposing bottom wall of said base in direction toward an opposing right side of the bottom wall of said base, a second pivot shaft chamber defined between the bottom wall of said base and said second bearing portion, and a second gap defined between a distal end of said second bearing portion and the bottom wall of said base in communication with one lateral side of said second pivot shaft chamber;

said pivot shaft set comprises a first pivot shaft and a second pivot shaft, said first pivot shaft comprising a first shaft body mounted in said first pivot shaft chamber of said axle housing and a first positioning tip axially extended from one end of said first shaft body, said second pivot shaft comprising a second shaft body mounted in said second pivot shaft chamber of said axle housing and a second positioning tip axially extended from one end of said second shaft body;

said transmission mechanism comprises a first transmission member and a second transmission member, said first transmission member comprising a first connection hole fixedly fastened to said first positioning tip of said first pivot shaft and a first position-limit rod located at one side thereof adjacent to said first connection hole, said second transmission member comprising a second connection hole fixedly fastened to said second positioning tip of said second pivot shaft and a second position-limit rod located at one side thereof adjacent to said second connection hole;

said link comprises a first position-limit hole and a second position-limit hole respectively disposed near two distal ends thereof and respectively coupled to said first position-limit rod and said second position-limit rod of said transmission mechanism, said first position-limit hole defining a first abutment portion near said second position-limit hole and a second abutment portion remote from said second position-limit hole, the distance between said first abutment portion and said second abutment portion being larger than the outer diameter of said first position-limit rod.

2. The dual-shaft hinge as claimed in claim 1, further comprising a first positioning member and a second positioning member respectively mounted at opposing front and back sides of said axle housing, said second positioning member being set between said axle housing and said transmission mechanism, said first positioning member comprising a first positioning hole and a second positioning hole, said second positioning member comprising a third positioning hole and a fourth positioning hole, said first positioning hole and said third positioning hole being respectively pivotally coupled to two opposite ends of said first shaft body of said pivot shaft set, said second positioning hole and said fourth positioning hole being respectively pivotally coupled to two opposite ends of said second shaft body of said pivot shaft set.

3. The dual-shaft hinge as claimed in claim 1, further comprising a first positioning member mounted on one side of said axle housing remote from said transmission mechanism, said first positioning member comprising a first positioning hole and a second positioning hole respectively disposed near two distal ends thereof and respectively pivotally coupled to one end of said first shaft body of said pivot shaft set and one end of said second shaft body of said pivot shaft set, and a stop block located at one side thereof between said first positioning hole and said second positioning hole, said stop block having a first abutment surface and a second abutment surface bilaterally disposed near said first positioning hole and a third abutment surface and a fourth abutment surface bilaterally disposed near said second positioning hole; said first shaft body comprises a first position-limit flange extending around the periphery thereof and disposed adjacent to said first positioning member, said first position-limit flange being stoppable between said first abutment surface and said second abutment surface to limit the range of rotation of said first shaft body; said second shaft body comprises a second position-limit flange extending around the periphery thereof and disposed adjacent to said first positioning member, said second position-limit flange being stoppable between said third abutment surface and said fourth abutment surface to limit the range of rotation of said second shaft body.

4. The dual-shaft hinge as claimed in claim 1, wherein said second position-limit hole of said link defines a third abutment portion near said first position-limit hole and a fourth abutment portion remote from first position-limit hole, the distance between said third abutment portion and said fourth abutment portion being larger than the outer diameter of said second position-limit rod.

* * * * *